United States Patent
Phillips

4,056,304
Nov. 1, 1977

[54] LIGHT MODULATION EMPLOYING SINGLE CRYSTAL OPTICAL WAVEGUIDES OF NIOBIUM-DOPED LITHIUM TANTALATE

[75] Inventor: William Phillips, Princeton, N.J.

[73] Assignee: RCA Corporation, New York, N.Y.

[21] Appl. No.: 744,126

[22] Filed: Nov. 22, 1976

Related U.S. Application Data

[60] Division of Ser. No. 555,725, March 6, 1975, which is a continuation-in-part of Ser. No. 442,844, Feb. 15, 1974, abandoned, which is a continuation-in-part of Ser. No. 434,408, Jan. 18, 1974, abandoned.

[51] Int. Cl.$^2$ ............................ G02B 5/23; B05D 5/06
[52] U.S. Cl. ................................ 350/96 WG; 427/162; 350/160 R
[58] Field of Search ............... 350/96 WG, 160 R; 427/162, 163; 423/593; 252/518, 62.3, 62.9

[56] References Cited

U.S. PATENT DOCUMENTS

| | | | |
|---|---|---|---|
| 3,417,032 | 12/1968 | Bonner et al. | 252/62.9 X |
| 3,785,717 | 1/1974 | Cresot et al. | 350/96 WG |
| 3,837,827 | 9/1974 | Corruthers et al. | 350/96 WG |

OTHER PUBLICATIONS

Hammer et al., "Low Loss Single Mode Optical Waveguide", Applied Physics Letters, vol. 24, June 1, 1974, pp. 545–547.
Tien et al., "Optical Waveguide Modes in Single-Crystalline $LiNbO_3$–$LiTaO_3$ Solid-Solution Films", Appl. Physics Lett. vol. 24, May 1974, pp. 503–506.
Minakata et al., "$LiNb_xTa_{1-x}O_3$ Optical Waveguiding Layer in $LiTaO_3$ Applied Physics Letters, vol. 26, pp. 395–398, Apr. 1, 1975.
Standley et al., "Nb-diffused $LiTaO_3$ Optical Waveguides", Applied Physics Letters, vol. 25, pp. 711–713, Dec. 1974.

Primary Examiner—John K. Corbin
Assistant Examiner—Rolf Hille
Attorney, Agent, or Firm—H. Christoffersen; Birgit E. Morris; Joseph T. Harcarik

[57] ABSTRACT

An optical waveguide of niobium-doped lithium tantalate single crystal has excellent low loss waveguiding properties with strong electro-optic behavior. The waveguides are made by depositing a film of niobium on a polished lithium tantalate crystal, annealing the crystal so as to diffuse the niobium into the crystal and cooling the crystal.

10 Claims, 3 Drawing Figures

LIGHT MODULATION EMPLOYING SINGLE CRYSTAL OPTICAL WAVEGUIDES OF NIOBIUM-DOPED LITHIUM TANTALATE

The invention herein described was made in the course of or under a contract with the U.S. Government.

This application is a division of application Ser. No. 555,725, filed Mar. 6, 1975 which is a continuation-in-part of my copending application Ser. No. 442,844 filed Feb. 15, 1974, now abandoned, which in turn is a continuation-in-part of my copending application Ser. No. 434,408 filed Jan. 18, 1974, now abandoned.

This invention relates to novel optical waveguides and a method of making them. More particularly, this invention relates to low loss optical waveguides of niobium doped lithium tantalate crystals. The waveguides of the invention are useful for switching, modulating and deflecting coherent light.

BACKGROUND OF THE INVENTION

Optical waveguides are used to propagate light from one point to another and are of increasing interest for use in optical communications systems. The light is propagated along a material that has a higher refractive index than surrounding material. Because of its high refractive index and excellent electro-optic properties, lithium niobate has been of interest in making thin film waveguides. Heretofore lithium niobate has been deposited on suitable substrates, such as lithium tantalate, by several methods; by sputtering, by chemical vapor deposition; and by epitaxial growth by melting technique. These methods attempt to form a layer or film of single crystal lithium niobate in the substrate. These methods are tedious and lack reliability, and the resultant waveguides have relatively high losses in the optical transmission of light.

SUMMARY OF THE INVENTION

According to the present method of making waveguides, a niobium or niobium-oxide coated single crystal of lithium tantalate is heated to allow niobium to diffuse into the crystal. The resulting crystal has a niobium-rich layer near the surface which has excellent waveguiding properties. Modulators making use of these waveguides have low power and voltage requirements. These modulators are compatible with integrated circuit technology.

DETAILED DESCRIPTION OF THE INVENTION

The waveguides of the present invention are prepared by annealing a single crystal of lithium tantalate coated with a thin layer of niobium oxide at a temperature sufficient to cause niobium to diffuse into the crystal and cooling the crystal.

The niobium oxide layer can be applied to the crystal directly, as by sputtering, but preferably a thin film of niobium is deposited on the surface of the lithium tantalate crystal which is then oxidized.

The niobium layer can be deposited by any convenient method onto a polished substrate crystal of lithium tantalate to a thickness of from about 25 to 5000 Angstroms, preferably 150 to 1500 Angstroms, depending on the properties desired in the final waveguide. Such methods include evaporating, sputtering, ion implantation and the like. The orientation of the lithium tantalate crystal is not critical and the orientation is chosen depending on the final waveguide properties desired.

Also depending on the final waveguide properties desired, the niobium can be applied as a uniform layer; as a layer of variable thickness in a predetermined pattern; in the form of a narrow strip which can be straight or curved around imitating an optical fiber; or can be thicker at one end of the substrate tapering to a thinner layer at the other end of the substrate. Other configurations can be employed, as will be apparent to one skilled in the art.

The niobium must then be oxidized to form niobium oxide. The niobium layer can be heated in an oxygen-containing atmosphere. The coated crystal can be exposed to oxygen while steadily increasing the temperature to the annealing temperature, or can be maintained for a time at a temperature of from about 300°-600° C. until oxidation is complete. Oxidation can also be carried out simultaneously with the deposition step, by carrying out the niobium deposition in an oxygen atmosphere while heating the substrate.

The coated substrate crystal is then annealed so as to allow the niobium to diffuse into the crystal. The crystal is heated to a temperature at which niobium diffusion occurs readily, which generally ranges between about 1050° to 1250° C. depending on the composition. The resultant crystal has the composition

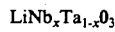

Figure 1:
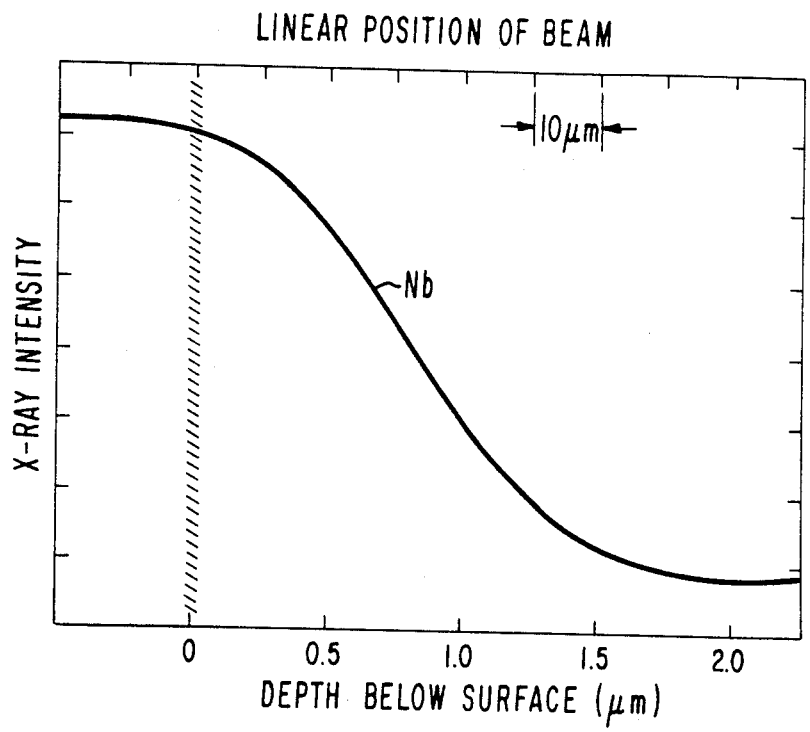
FIG. 1 is a graph of X-ray intensity which approximates the concentration of niobium as a function of depth in a crystal of the invention.

$LiNb_xTa_{1-x}O_3$ wherein $x$ can vary from about 0 to about 1.0, being highest at the surface of the resultant crystal and decreasing with increasing depth in the crystal. FIG. 1 shows the variation in niobium concentration as a function of depth in microns obtained by electron probe microanalysis from a waveguide angle lapped at 1.5°. The characteristic X-ray emission of niobium was excited using a 7 keV electron beam. The profile gives a good approximation of the niobium concentration as a function of depth and is consistent with what would be expected for a diffusion process.

The initial steps of the present process, applying niobium film, oxidizing, and annealing, can be repeated if desired to increase the niobium concentration in a certain area to apply the niobium in complex patterns and the like.

The time for annealing is somewhat dependent on the temperature and a longer time is required at lower temperatures. In general, annealing is continued for from about 0.5 to 36 hours within the temperature range 1050° to 1250° C. Preferably, the crystal is heated within the temperature 1100° to 1200° C.

The atmosphere used during the warm-up to the annealing step must contain sufficient oxygen to ensure that the film being annealed is niobium oxide. After the annealing temperature is reached, the atmosphere is no longer critical; an inert atmosphere, such as argon or nitrogen can be used; preferably, annealing is carried out in the presence of an oxygen-containing gas. When oxygen is present, niobium oxide will form from niobium at temperatures of about 300° to 400° C. At annealing temperatures, the niobium is allowed to diffuse into the substrate to form the waveguide. The oxygen-containing atmosphere can be pure oxygen, or oxygen admixed with an inert gas such as nitrogen, argon and the like.

The characteristics of the waveguide are controlled by varying the amount of niobium oxide or niobium applied and the depth to which the niobium is allowed to diffuse into the crystal. The strength of the refractive index change noted in the waveguide is directly proportional to the amount of niobium on the crystal and inversely proportional to its depth. By increasing the time and temperature of annealing, the diffusion of the niobium progresses deeper into the substrate crystal, and two, three or more mode waveguides can be made. The atmosphere of the annealing step also may have some effect on the properties of the resultant waveguide.

After annealing, the crystal is cooled to room temperature. Cooling can be carried out in an inert atmosphere or in the presence of oxygen. During annealing, the crystal may be reduced and discolored. Oxidizing the crystal after annealing will serve to remove this coloration.

In order to promote the formation of single domain crystals and to insure optimum dielectric properties, the crystal should be poled after annealing. This can be done in known manner by cooling the crystal from above the Curie temperature to below the Curie temperature in the presence of an electric field. Since the Curie temperature varies with the niobium concentration, poling should be continued from well above to below the Curie temperature of lithium tantalate, about 580° C. Poling in the presence of an electric field oriented parallel to the c axis of the crystal serves to uniformly align the ferroelectric domains. Poling is readily accomplished during the cooling step but can be done later as well.

Figure 2:
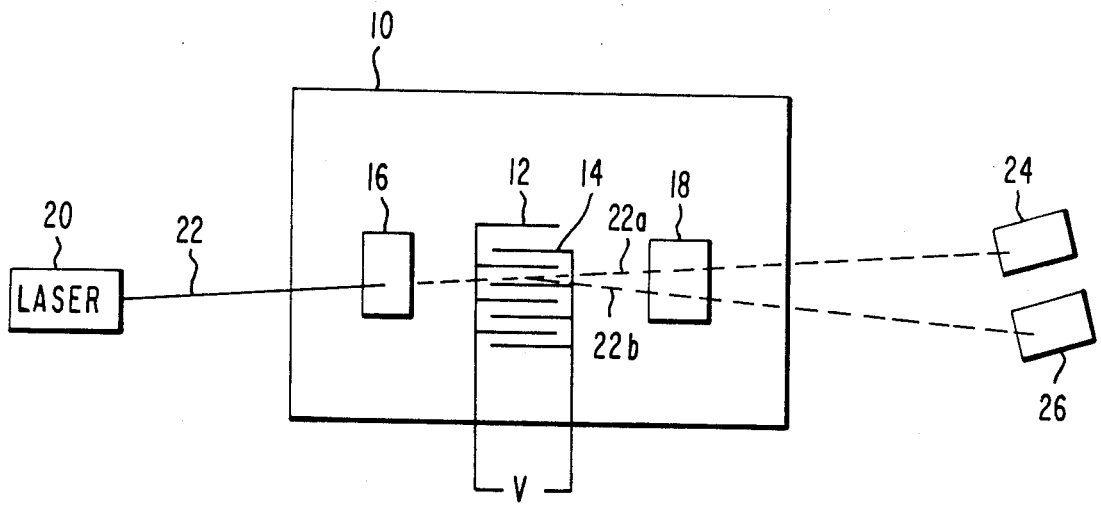
FIG. 2 is a partly schematic view of a deflector modulator employing a waveguide of the invention.

The crystals as prepared above can be used to make an efficient low-cost waveguide deflector or modulator. FIG. 2 shows a schematic view of such a deflector. The crystal 10 is a niobium-doped lithium tantalate crystal as prepared above. A pair of interdigitated electrodes 12 and 14 are deposited onto one surface of the crystal. While only one pair of electrodes are shown in FIG. 2, there can be more if desired. Optical input means 16, which can be a strontium titanate optical prism for example, is disposed on one side of the electrodes 12 and 14. Optical output means 18 is disposed on the other side of the electrodes 12 and 14. Diffraction gratings can be applied in place of the prisms 16 and 18 in known manner. If the layer is doped with iron, gratings can be formed by holographic techniques. A laser 20 serves as a source of coherent light.

In operation, a coherent light beam 22 is directed to the input prism 16 and enters the niobium-doped lithium tantalate crystal 10 at a certain angle. Application of a voltage to the electrodes 12 and 14 result in an electro-optically induced Bragg diffraction grating which diffracts the light entering the crystal 10, thereby deflecting it at an angle from the original direction. Thus one portion of the beam 22a travels in the original direction, emerging through one portion of output prism 18 and the deflected portion 22b of the beam travels at an angle to the original direction, emerging through another portion of the output prism 18. The two portions of the beam 22a and 22b can be detected by photomultipliers 24 and 26 respectively for further utilization, as by converting the beams to an electrical signal for further transmission.

The optical waveguides described herein are simple to make, have excellent and controllable waveguide properties and can be oriented to optimize their properties for particular applications. Their high efficiency and low voltage and power requirements make them eminently suitable for electro-optic modulators and switches.

The invention will be further illustrated by the following example, but the invention is not meant to be limited to the details described therein.

EXAMPLE 1

Several lithium tantalate crystals were cut and polished and a thin layer of niobium evaporated onto the polished surface. The crystals were charged to a furnace and heated to diffuse the niobium into the crystal. At the end of the designated time, the crystals were cooled. Most of them were subsequently reheated in oxygen and an electric field was applied to pole the crystals.

The conditions for these preparations are summarized in Table I below:

TABLE I

| CRYSTAL | CRYSTAL ORIENTATION | THICKNESS OF NIOBIUM, ANGSTROMS | ANNEALING TEMPERATURE, °C | ANNEALING TIME, HOURS | ANNEALING ATMOSPHERE | POLING MAXIMUM TEMPERATURE °C | POLING MAXIMUM CURRENT, μA |
|---|---|---|---|---|---|---|---|
| A | Y | 1000 | 1090 | 6.5 | argon* | 900 | 50 |
| B | Y | 1000 | 1094 | 9.5 | argon* | 950 | 40 |
| C | Y | 150 | 1100 | 9 | argon* | 950 | 40 |
| D | Y | 600 | 1055 | 9 | argon* | 1000 | 15 |
| E | Y | 900 | 1150 | 8.75 | argon* | 1040 | 20 |
| F | X | 600 | 1095 | 8 | argon* | 950 | 10 |
| G | X | 500 | 1100 | 6 | argon* | — | — |
| H | Y | 500 | 1100 | 6 | argon* | — | — |
| I | Y | 500 | 1100 | 8.75 | nitrogen* | 1000 | 10 |
| J | Y | 400 | 1100 | 8 | air | — | — |
| K | Y | 800 | 1160 | 0.75 | oxygen | 1050 | 2 |

*contains at least 2 ppm of oxygen

Each of these conditions resulted in formation of a waveguide.

Using an apparatus as shown in FIG. 2, the crystal designated as crystal A was used as a deflector. Over 80% of the light entering the crystal was switched at various light wavelengths. Increasing voltage is required for increasing light wavelengths, as shown in Table II below:

TABLE II

| LASER | WAVELENGTH ANGSTROMS | REQUIRED VOLTAGE |
|---|---|---|
| He-Se | 4976 | 6 |

TABLE II-continued

| LASER | WAVELENGTH ANGSTROMS | REQUIRED VOLTAGE |
| --- | --- | --- |
| He-Se | 5592 | 7.4 |
| He-Ne | 6328 | 10.5 |

The above results were the same using a DC current source, and also using a high speed pulser having a rise time of less than 3 nanoseconds.

Figure 3:
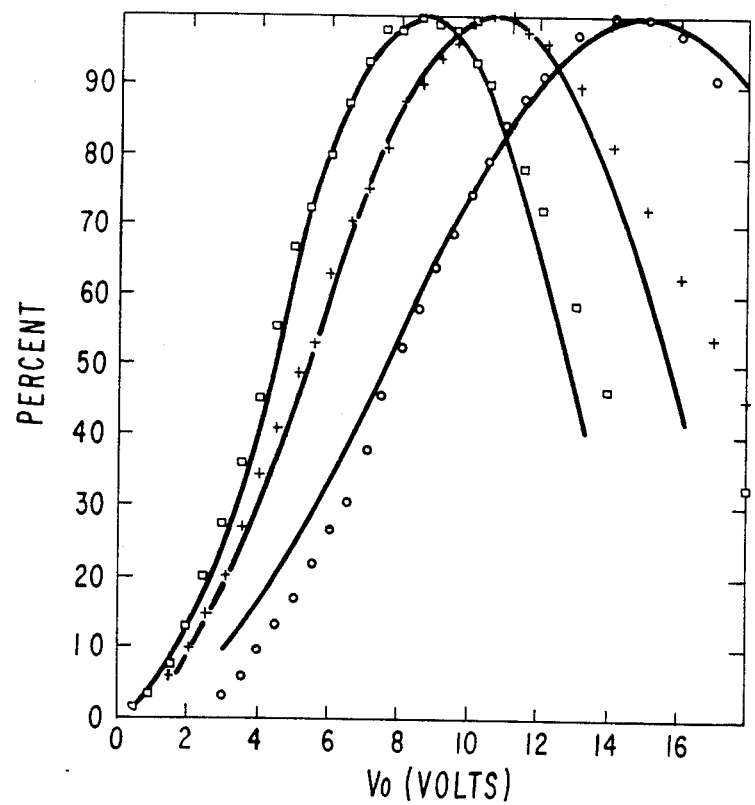
FIG. 3 is a graph of the percentage of light diffracted as a function of voltage for three laser wavelengths.

The data above was obtained by measuring the intensity of the switched beam with a suitable photodetector versus voltage, plotting the results and normalizing the peaks as 100%. FIG. 3 is a graph of the results obtained, wherein the squares are data points for light at 4976 Angstroms, the crosses are data points for light at 5592 Angstroms, and the circles are data points for light at 6328 Angstroms. The solid lines of FIG. 3 are plots of a sine wave curve normalized to 75% intensity.

The losses in the waveguide designated as crystal C using light at 6328 Angstroms were below 1 dB/cm, measured by recording the downstream decay of the scattered light with a fiber optic probe, as described by Hammer et al, Appl. Phys. Lett. 21, 358 (1972). The losses at 4976 and 5592 Angstroms were 6.7 and 4.3 dB/cm respectively.

EXAMPLES 2-3

Two Y-cut lithium tantalate crystals were coated with 600 Angstroms and 1000 Angstroms of niobium respectively. The crystals were heated at 400° C. in oxygen for 3 hours when the niobium films had been converted to clear niobium oxide films. The crystals were then heated at 1100° C. in argon for 9 hours. Both crystals behaved as efficient waveguides.

EXAMPLE 4

A film of niobium 400 Angstroms thick was evaporated onto a lithium tantalate crystal and heated in air at 400° C. for 2 hours when a clear niobium oxide film had formed. The crystal was heated in air at 1194° C. for about 8 hours and poled during cooling. A low loss waveguide was obtained.

EXAMPLE 5

A film of niobium 400 Angstroms thick was evaporated onto a lithium tantalate crystal and heated in air for 2 hours at 400° C. to form a niobium oxide film. The crystal was annealed in oxygen at 1090° C. for 8.5 hours and cooled. The crystal was then poled by heating to about 1000° C. and cooling it while a current of 10 microamperes was passed through the crystal. A low loss waveguide was obtained.

I claim:

1. In a light modulator comprising a source of coherent light, an optical waveguide, a plurality of electrodes disposed in said waveguide, optical input means disposed on one side of said electrodes and optical output means disposed on the other side of said electrodes, the improvement which comprises employing as said optical waveguide a crystal prepared by depositing a film of niobium oxide on one surface of a polished single crystal of lithium tantalate, annealing the single cyrstal of lithium tantalate so as to allow the niobium to diffuse into the crystal and cooling the crystal.

2. In a light modulator comprising a source of coherent light, an optical waveguide, a plurality of electrodes disposed on said waveguide, optical input means disposed on one side of said electrodes and optical output means disposed on the other side of said electrodes, the improvement which comprises employing as said optical waveguide a crystal prepared by depositing a film of niobium on one surface of a polished single crystal of lithium tantalate, oxidizing the niobium, annealing the crystal at an elevated temperature to allow the niobium to diffuse into the crystal, and cooling to room temperature.

3. A light modulator according to claim 2 wherein the deposited niobium film is from about 25 to 5,000 Angstroms thick.

4. A light modulator according to claim 2 wherein the annealing step is carried out at a temperature from about 1,050° to 1,250° C.

5. A light modulator according to claim 2 wherein the annealing step is carried out at a temperature from about 1,100° to 1,200° C.

6. A light modulator according to claim 2 wherein the annealing step is carried out in an atmosphere of argon and oxygen.

7. A light modulator according to claim 2 wherein the annealing step is carried out in an atmosphere of nitrogen and oxygen.

8. A light modulator according to claim 2 wherein the annealing step is carried out in air.

9. A light modulator according to claim, 2 wherein the niobium is oxidized at about 300°-600° C.

10. A light modulator according to claim 2 wherein the crystal is poled during the cooling step.

* * * * *